(12) United States Patent
Mitarai

(10) Patent No.: US 10,744,826 B2
(45) Date of Patent: Aug. 18, 2020

(54) PNEUMATIC TIRE

(71) Applicant: SUMITOMO RUBBER INDUSTRIES, LTD., Kobe-shi, Hyogo (JP)

(72) Inventor: Yasuo Mitarai, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 613 days.

(21) Appl. No.: 15/400,597

(22) Filed: Jan. 6, 2017

(65) Prior Publication Data

US 2017/0197477 A1    Jul. 13, 2017

(30) Foreign Application Priority Data

Jan. 8, 2016  (JP) ................................. 2016-002378

(51) Int. Cl.
| | | |
|---|---|---|
| B60C 17/00 | (2006.01) | |
| B60C 9/28 | (2006.01) | |
| B60C 15/00 | (2006.01) | |

(52) U.S. Cl.
CPC ............ B60C 17/0009 (2013.01); B60C 9/28 (2013.01); B60C 15/0045 (2013.01); *B60C 2009/283* (2013.01); *B60C 2017/0054* (2013.01); *B60C 2017/0063* (2013.01); *B60C 2017/0072* (2013.01)

(58) Field of Classification Search
CPC . B60C 17/00; B60C 17/0009; B60C 17/0018; B60C 17/0027; B60C 17/0036; B60C 17/0045; B60C 2001/0033; B60C 2017/0054; B60C 2017/0063; B60C 2017/0072; B60C 9/28; B60C 2009/283; B60C 3/04; B60C 3/00
USPC ........................................................ 152/517
See application file for complete search history.

(56) References Cited

U.S. PATENT DOCUMENTS

| | | | |
|---|---|---|---|
| 6,533,011 B2 * | 3/2003 | Tobino ................ B60C 17/0009 |
| | | | 152/517 X |
| 6,901,983 B2 * | 6/2005 | Murata ............... B60C 17/0009 |
| | | | 152/517 X |
| 7,900,671 B2 * | 3/2011 | Miyazaki ............ B60C 17/0009 |
| 2011/0005655 A1 * | 1/2011 | Imoto ................. B60C 17/0009 |
| | | | 152/517 |

(Continued)

FOREIGN PATENT DOCUMENTS

| | | |
|---|---|---|
| EP | 3 103 659 A1 * | 12/2016 |
| JP | 2007069890 A * | 3/2007 |

(Continued)

OTHER PUBLICATIONS

English machine translation of JP 2007-69890 A, Mar. 22, 2007.*
English machine translation of JP 2009-137448 A, Jun. 25, 2009.*

*Primary Examiner* — Adrienne C. Johnstone
(74) *Attorney, Agent, or Firm* — Birch, Stewart, Kolasch & Birch, LLP

(57) ABSTRACT

In a tire 2, each load support layer 22 extends from a side portion 24 of the tire 2 to a radially inner side of a belt 14 at an inner side of a carcass 12. A ratio (SP/WB) of a width SP from an equator plane to an outer edge 48 of the load support layer 22, relative to a width WB from the equator plane to an edge of the belt 14, in an axial direction is equal to or greater than 0.1 and equal to or less than 0.6.

3 Claims, 4 Drawing Sheets

(56) References Cited

U.S. PATENT DOCUMENTS

| | | | | |
|---|---|---|---|---|
| 2013/0199688 A1* | 8/2013 | Nakazaki | ............ | B60C 17/0009 |
| | | | | 152/517 |
| 2017/0008352 A1* | 1/2017 | Ogawa | ................ | B60C 17/0009 |
| 2017/0036494 A1* | 2/2017 | Ogawa | ................ | B60C 17/0009 |

FOREIGN PATENT DOCUMENTS

| | | | | |
|---|---|---|---|---|
| JP | 2009137447 A | * | 6/2009 | |
| JP | 2009137448 A | * | 6/2009 | |
| JP | 2010-163108 A | | 7/2010 | |
| JP | 2016164007 A | * | 9/2016 | |
| WO | WO-2015/115162 A1 | * | 8/2015 | |
| WO | WO-2015/115163 A1 | * | 8/2015 | |
| WO | WO-2015/159576 A1 | * | 10/2015 | |

* cited by examiner

PNEUMATIC TIRE

This application claims priority on Patent Application No. 2016-002378 filed in JAPAN on Jan. 8, 2016. The entire contents of this Japanese Patent Application are hereby incorporated by reference.

BACKGROUND OF THE INVENTION

Field of the Invention

The present invention relates to pneumatic tires. Specifically, the present invention relates to run flat tires including load support layers.

Description of the Related Art

In a run flat tire including load support layers inside sidewalls, if the internal pressure is reduced due to puncture, a load is supported by the support layers. The run flat tire allows for running for some distance even in the punctured state. Running in the punctured state is referred to as run-flat running. If run-flat running is continued, deformation and restoration of the support layers are repeated. Due to the repetition, heat is generated in the support layers, and the temperature of the tire reaches a high temperature. Tires are desired which withstand the deformation and the high temperature and allow for run-flat running for a long period of time. Tires having excellent run-flat durability are desired.

The run-flat durability can be improved by increasing the thickness of each load support layer. However, the load support layers having a large thickness increase the vertical stiffness constant of the tire. The high vertical stiffness constant impairs ride comfort during normal running. In addition, the load support layers having a large thickness increase the weight of the tire. This increases the rolling resistance. There is also a high demand for run flat tires that have excellent ride comfort and whose increase in weight is suppressed.

Examination regarding a run flat tire is disclosed in JP2010-163108. In this tire, by adjusting the thickness of each side reinforcing rubber (load support layer), improvement of ride comfort and reduction of the weight thereof are achieved without impairing run-flat durability.

Run flat tires are desired which have further improved run-flat durability while deterioration of ride comfort and an increase in the weight thereof are suppressed.

An object of the present invention is to provide a pneumatic tire having improved run-flat durability while favorable ride comfort during normal running and an appropriate weight thereof are maintained.

SUMMARY OF THE INVENTION

A pneumatic tire according to the present invention includes a tread, a pair of beads, a carcass, a belt, and a pair of load support layers. The carcass extends on and between the one bead and the other bead. The belt is laminated on the carcass at a radially inner side of the tread. Each load support layer extends from a side portion of the tire to a radially inner side of the belt at an inner side of the carcass. A ratio (SP/WB) of a width SP from an equator plane to an outer edge of the load support layer, relative to a width WB from the equator plane to an edge of the belt, in an axial direction is equal to or greater than 0.1 and equal to or less than 0.6.

The inventors have made detailed examination for a relationship between the shape of a tire during run-flat running and run-flat durability thereof. During run-flat running, "buckling" occurs in which the tread becomes curved such that the vicinity of the center of the tread rises from the ground. Only the vicinity of each shoulder portion of the tire is in contact with the ground. The inventors have found that the positional relationship between a ground contact surface and a belt at this time greatly influences the run-flat durability. The inventors have found that the run-flat durability can be improved by causing the belt to be present above the ground contact surface (at the radially inner side thereof).

In the pneumatic tire according to the present invention, each load support layer extends from the side portion to the radially inner side of the belt at the inner side of the carcass. The ratio (SP/WB) of the width SP from the equator plane to the outer edge of the load support layer, relative to the width WB from the equator plane to the edge of the belt, in the axial direction is equal to or greater than 0.1 and equal to or less than 0.6. The load support layer whose outer edge extends to this position increases the bending stiffness in the vicinity of a shoulder portion of the tread. The load support layer reduces buckling. Thus, the ground contact area during run-flat running is increased. By the load support layer, the belt can be caused to be present above the ground contact surface (at the radially inner side thereof) during run-flat running. In the tire, the run-flat durability is improved. The load support layer almost does not influence the vertical stiffness constant and the weight thereof. In the tire, favorable ride comfort during normal running and an appropriate weight are maintained.

Preferably, when a position on an outer surface of the tire at which position the tire has a maximum width is denoted by PW, a height in a radial direction from the position PW to the edge of the belt is denoted by HB, and a height in the radial direction from the position PW to a radially outer edge of the belt is denoted by HT, a ratio (HB/HT) of the height HB relative to the height HT is equal to or greater than 0.60 and equal to or less than 0.75.

Preferably, a ratio (WB/W) of the width WB from the equator plane relative to a width W from the equator plane to the position PW is equal to or greater than 0.85 and equal to or less than 0.90.

Preferably, the carcass includes a carcass ply. The carcass ply is turned up around each bead from an inner side toward an outer side in the axial direction, and because of this turning-up, a main portion and turned-up portions are formed in the carcass ply. An edge of each turned-up portion reaches a position between the edge of the belt and the outer edge of the load support layer. When a thickness of the load support layer which thickness is measured along a normal line V1 drawn from the edge of the turned-up portion toward an outer surface of the load support layer is denoted by T1, and a thickness of the load support layer which thickness is measured along a normal line V2 drawn from an outer edge of the belt toward the outer surface of the load support layer is denoted by T2, a ratio (T2/T1) of the thickness T2 relative to the thickness T1 is equal to or greater than 1.0 and equal to or less than 8.0.

Preferably, when a point of intersection between an outer surface of the turned-up portion and a normal line VC drawn from the edge of the belt toward the outer surface of the turned-up portion is denoted by PC, a distance WC from the edge of the turned-up portion to the point PC which distance is measured along the outer surface of the turned-up portion is equal to or greater than 20 mm and equal to or less than 40 mm.

DESCRIPTION OF THE PREFERRED EMBODIMENTS

The following will describe in detail the present invention based on preferred embodiments with appropriate reference to the drawings.

Figure 1:
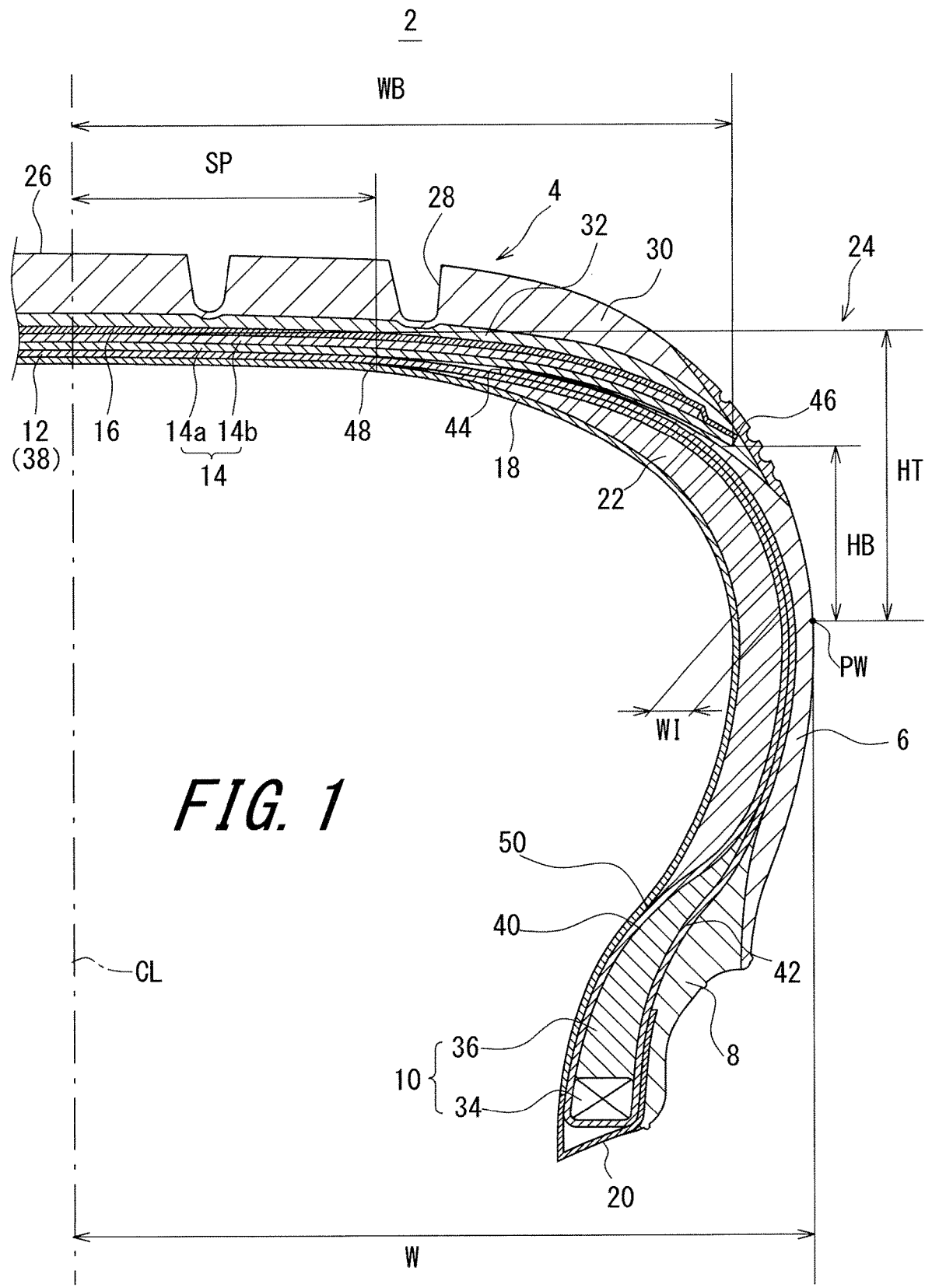
FIG. 1 is a cross-sectional view of a portion of a tire according to an embodiment of the present invention.

FIG. 1 shows a pneumatic tire 2. In FIG. 1, the up-down direction is the radial direction of the tire 2, the right-left direction is the axial direction of the tire 2, and the direction perpendicular to the surface of the sheet is the circumferential direction of the tire 2. In FIG. 1, an alternate long and short dash line CL represents the equator plane of the tire 2. The shape of the tire 2 is symmetrical about an equator plane CL except for a tread pattern.

The tire 2 includes a tread 4, a pair of sidewalls 6, a pair of clinches 8, a pair of beads 10, a carcass 12, a belt 14, a band 16, an inner liner 18, a pair of chafers 20, and a pair of load support layers 22. A portion of the tire 2 which portion extends from the vicinity of each edge of the tread 4 inward in the radial direction is referred to as a side portion 24. Each sidewall 6, each clinch 8, each bead 10, each chafer 20, and a portion of each load support layer 22 are located in the side portion 24. A central portion of the tire 2 other than the side portion 24 is referred to as a crown portion. The tire 2 is of a tubeless type. The tire 2 is mounted to a passenger car.

The tread 4 has a shape projecting outward in the radial direction. The tread 4 forms a tread surface 26 that is brought into contact with a road surface. Grooves 28 are formed on the tread surface 26 so as to extend in the circumferential direction and be aligned in the axial direction. The tread pattern is formed by the grooves 28. The tread 4 includes a cap layer 30 and a base layer 32. The cap layer 30 is located outward of the base layer 32 in the radial direction. The cap layer 30 is laminated on the base layer 32. The cap layer 30 is formed from a crosslinked rubber that is excellent in wear resistance, heat resistance, and grip performance. The base layer 32 is formed from a crosslinked rubber that is excellent in adhesiveness. A typical base rubber of the base layer 32 is a natural rubber. The tread 4 is formed from a crosslinked rubber that is excellent in wear resistance, heat resistance, and grip performance.

Each sidewall 6 extends from the edge of the tread 4 substantially inward in the radial direction. The radially outer edge of the sidewall 6 is joined to the tread 4. The sidewall 6 is formed from a crosslinked rubber that is excellent in cut resistance and weather resistance. The sidewall 6 is located outward of the carcass 12 in the axial direction. The sidewall 6 prevents the carcass 12 from being damaged.

In light of prevention of damage, a hardness of each sidewall 6 is preferably equal to or greater than 50 and more preferably equal to or greater than 55. In light of ride comfort in a normal state, the hardness is preferably equal to or less than 70 and more preferably equal to or less than 65.

In the present embodiment, the hardness is measured according to the standard of "JIS K6253" with a type A durometer. The hardness is measured by pressing the durometer against the cross section shown in FIG. 1. The measurement is performed at 23° C. Hardnesses of each clinch 8, each apex, and each load support layer 22 described later are measured in the same manner.

Each clinch 8 is located substantially inward of the sidewall 6 in the radial direction. The clinch 8 is located outward of the bead 10 and the carcass 12 in the axial direction. The clinch 8 is formed from a crosslinked rubber that is excellent in wear resistance. The clinch 8 comes into contact with a flange of a rim, which is not shown.

In light of wear resistance, the hardness of the clinch 8 is preferably equal to or greater than 60 and more preferably equal to or greater than 65. In light of ride comfort in a normal state, the hardness is preferably equal to or less than 90 and more preferably equal to or less than 80.

Each bead 10 is located inward of the clinch 8 in the axial direction. The bead 10 includes a core 34 and an apex 36 extending from the core 34 outward in the radial direction. The core 34 has a ring shape and includes a non-stretchable wound wire. A typical material of the wire is steel. The apex 36 is tapered outward in the radial direction. The apex 36 is formed from a highly hard crosslinked rubber.

From the standpoint that a bead 10 portion has appropriate stiffness, the hardness of the apex 36 is preferably equal to or greater than 60 and more preferably equal to or greater than 65. In light of ride comfort in a normal state, the hardness is preferably equal to or less than 90 and more preferably equal to or less than 80.

The carcass 12 extends from the one side portion 24 to the other side portion 24. The carcass 12 includes a carcass ply 38. The carcass ply 38 extends on and between the beads 10 at both sides. The carcass ply 38 extends along the tread 4 and each sidewall 6. The carcass ply 38 is turned up around each core 34 from the inner side toward the outer side in the axial direction. Because of this turning-up, a main portion 40 and turned-up portions 42 are formed in the carcass ply 38. Each turned-up portion 42 extends to a position between an edge 46 of the belt 14 and an outer edge 48 of the load support layer 22 in the axial direction. An edge 44 of the turned-up portion 42 reaches a position between the edge 46 of the belt 14 and the outer edge 48 of the load support layer 22. The carcass 12 has a so-called "ultra-highly turned-up structure". The carcass 12 having the ultra-highly turned-up structure contributes to the durability of the tire 2 in a punctured state. The carcass 12 may include two or more carcass plies 38.

As shown in FIG. 1, the main portion 40 is located inward of the apex 36 in the axial direction. The turned-up portion 42 is located outward of the apex 36 in the axial direction. In other words, the apex 36 is located between the main portion 40 and the turned-up portion 42 of the carcass ply 38.

The carcass ply 38 includes a large number of cords aligned with each other, and a topping rubber, which are not shown. The absolute value of the angle of each cord relative to the equator plane CL is 75° to 90°. In other words, the carcass 12 has a radial structure. The cords are formed from an organic fiber. Examples of preferable organic fibers include polyethylene terephthalate fibers, nylon fibers, rayon fibers, polyethylene naphthalate fibers, and aramid fibers.

The belt 14 is located inward of the tread 4 in the radial direction. The belt 14 is laminated on the carcass 12. The belt 14 reinforces the carcass 12. In this embodiment, the belt 14 includes an inner layer 14a and an outer layer 14b. As is obvious from FIG. 1, the width of the inner layer 14a is slightly larger than the width of the outer layer 14b. That is, in this embodiment, an edge of the inner layer 14a is the edge 46 of the belt 14. Each of the inner layer 14a and the outer layer 14b includes a large number of cords aligned with each other, and a topping rubber, which are not shown.

Each cord is tilted relative to the equator plane CL. The absolute value of the tilt angle is normally equal to or greater than 10° and equal to or less than 35°. The direction in which each cord of the inner layer 14a is tilted relative to the equator plane CL is opposite to the direction in which each cord of the outer layer 14b is tilted relative to the equator plane CL. The material of the cords is preferably steel. An organic fiber may be used for the cords. The belt 14 may include three or more layers.

The band 16 is located outward of the belt 14 in the radial direction. The width of the band 16 is substantially equal to the width of the belt 14 in the axial direction. The band 16 includes a cord and a topping rubber, which are not shown. The cord is helically wound. The band 16 has a so-called jointless structure. The cord extends substantially in the circumferential direction. The angle of the cord relative to the circumferential direction is equal to or less than 5° and further equal to or less than 2°. The belt 14 is held by the cord, so that lifting of the belt 14 is suppressed. The cord is formed from an organic fiber. Examples of preferable organic fibers include nylon fibers, polyester fibers, rayon fibers, polyethylene naphthalate fibers, and aramid fibers.

The belt 14 and the band 16 form a reinforcing layer. The reinforcing layer may be composed of only the belt 14.

The inner liner 18 is joined to the inner surfaces of the carcass 12 and each load support layer 22. The inner liner 18 is formed from a crosslinked rubber. For the inner liner 18, a rubber that is excellent in air blocking property is used. The inner liner 18 maintains the internal pressure of the tire 2.

Each chafer 20 is located in the vicinity of the bead 10. When the tire 2 is mounted onto the rim, the chafer 20 comes into contact with the rim. Because of this contact, the vicinity of the bead 10 is protected. The chafer 20 includes a fabric and a rubber with which the fabric is impregnated. The chafer 20 may be integrated with the clinch 8. In this case, the material of the chafer 20 is the same as the material of the clinch 8.

Each load support layer 22 is located inward of the carcass 12. The load support layer 22 is located outward of the inner liner 18. The load support layer 22 is interposed between the carcass 12 and the inner liner 18. The load support layer 22 extends from the side portion 24 to the radially inner side of the belt 14. The load support layer 22 overlaps the belt 14. At the inner side of the belt 14, the load support layer 22 is tapered inward in the axial direction. This end is referred to as the outer edge 48 of the load support layer 22. The outer edge 48 of the load support layer 22 is located inward of the edge 44 of the turned-up portion 42 in the axial direction. In the side portion 24, the load support layer 22 is tapered inward in the radial direction. This end is referred to as an inner edge 50 of the load support layer 22. The inner edge 50 of the load support layer 22 is located inward of the outer edge of the apex 36 in the radial direction. The load support layer 22 overlaps the apex 36.

In FIG. 1, a double-headed arrow SP indicates the width in the axial direction from the equator plane to the outer edge 48 of the load support layer 22. A double-headed arrow WB indicates the width in the axial direction from the equator plane CL to the edge 46 of the belt 14. In the tire 2, the ratio (SP/WB) of the width SP relative to the width WB is equal to or greater than 0.1 and equal to or less than 0.6.

From the standpoint that a load can be supported during run-flat running, the hardness of each load support layer 22 is preferably equal to or greater than 60 and more preferably equal to or greater than 65. In light of ride comfort in a normal state, the hardness is preferably equal to or less than 90 and more preferably equal to or less than 80.

The following will describe advantageous effects of the present invention.

Figure 3:
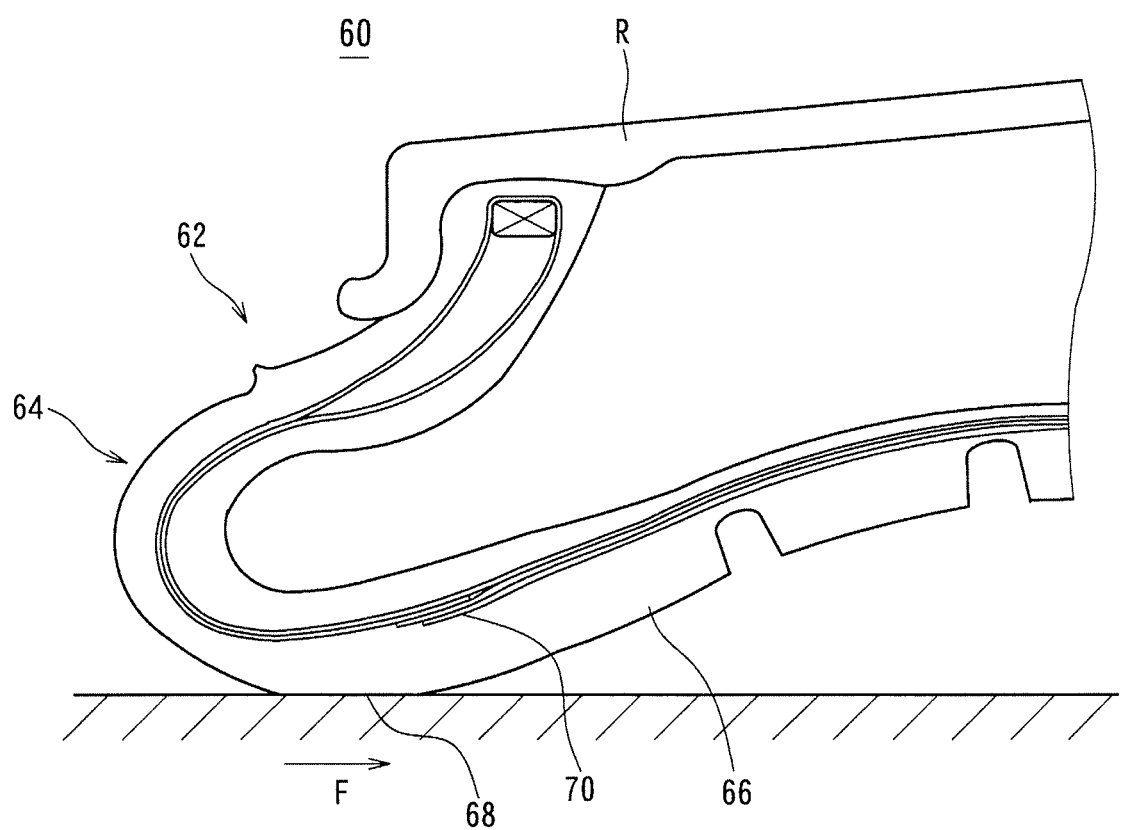
FIG. 3 is a schematic diagram of a conventional tire in a run-flat running state.

FIG. 3 is a schematic diagram showing a state of a general run flat tire 60 during run-flat running. The tire 60 is mounted on a rim R. During run-flat running, each load support layer supports a load. Due to the load, each load support layer bends. Each side portion 62 of the tire 60 becomes curved. The vicinity of each buttress portion 64 of the tire 60 deforms so as to enter in a direction toward a central portion of a tread 66. Thus, a compressive force toward the inner side in the axial direction is applied to the tread 66. An arrow F indicates the compressive force. Although not shown, a compressive force in the circumferential direction is also applied to a ground contact portion of the tread 66. Thus, as shown in FIG. 3, the tread 66 becomes curved such that the vicinity of the center thereof rises from the ground. This curving is referred to as buckling. Accordingly, only the vicinity of each shoulder portion of the tire 60 is in contact with the ground.

The inventors have found that the positional relationship between a ground contact surface and a belt during run-flat running greatly influences run-flat durability. As shown in FIG. 3, in the tire 60, a belt 70 is almost not present above a ground contact surface 68 (at the radially inner side thereof). The ground contact surface 68 and the belt 70 have almost no overlapping portion in the radial direction. In the tire 60, the vehicle weight is supported by almost only rubber. This can cause damage of the tire 60. The inventors have found that run-flat durability can be improved by increasing the size of a portion where the ground contact surface 68 and the belt 70 overlap each other.

Figure 4:
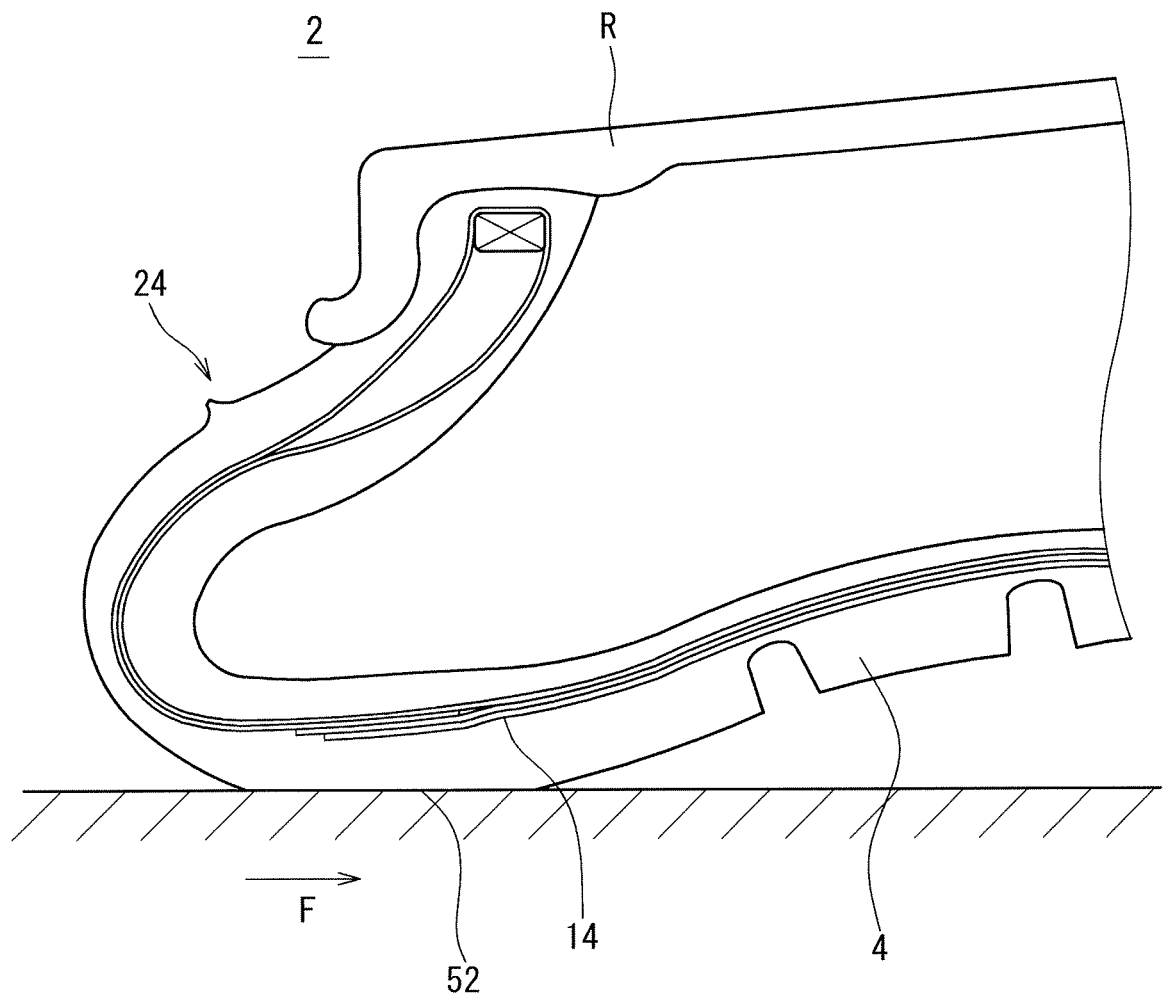
FIG. 4 is a schematic diagram of the tire in FIG. 1 in a run-flat running state.

FIG. 4 is a schematic diagram showing a state of the run flat tire 2 according to the present invention during run-flat running. As described above, in the tire 2, each load support layer 22 extends from the side portion 24 to the radially inner side of the belt 14. The ratio (SP/WB) of the width SP relative to the width WB is equal to or greater than 0.1 and equal to or less than 0.6. The load support layer 22 whose outer edge extends to this position increases the bending stiffness in the vicinity of a shoulder portion of the tread 4. The load support layer 22 reduces buckling. Thus, the ground contact area during run-flat running is increased. By the load support layer 22, the belt 14 can be caused to be present above a ground contact surface 52 (at the radially inner side thereof) during run-flat running. The size of a portion where the ground contact surface 52 and the belt 14 overlap each other during run-flat running can be increased. In the tire 2, the run-flat durability is improved.

Extending the outer edge 48 of each load support layer 22 to a position where the ratio (SP/WB) is equal to or greater than 0.1 and equal to or less than 0.6, almost does not influence the vertical stiffness constant. In the tire 2, an appropriate vertical stiffness constant is maintained. With the tire 2, favorable ride comfort is maintained. Furthermore, even when the outer edge 48 of each load support layer 22 extends to the above position, influence on the weight of the tire 2 is small. In the tire 2, an appropriate weight is maintained.

In the tire 2, since the ratio (SP/WB) is equal to or greater than 0.1, the bending stiffness of the tread 4 is kept appropriate. Change of the curvature of the tread 4 when the tire 2 comes into contact with the ground and becomes separated from the ground during normal running is appropriately suppressed. In the tire 2, an increase in the rolling resistance thereof is suppressed.

The ratio (SP/WB) is more preferably equal to or less than 0.5. By making the ratio (SP/WB) equal to or less than 0.5, the bending stiffness of the tread 4 is increased more. Buckling is more effectively suppressed. Thus, the ground contact area during run-flat running is further increased. In the tire 2, the run-flat durability is further improved. The ratio (SP/WB) is more preferably equal to or greater than 0.2. By making the ratio (SP/WB) equal to or greater than 0.2, an increase in the rolling resistance can be suppressed more effectively.

In FIG. 1, reference character PW represents a specific position on the outer surface of the tire 2. In the tire 2, the width in the axial direction represented in a profile of the outer surface is maximum at the position PW. In the tire 2, the length in the axial direction between the right and left side surfaces at the position PW is represented as the maximum width (also referred to as cross-sectional width) of the tire 2. In the present application, the position PW is a maximum width position of the tire 2.

In FIG. 1, a double-headed arrow HB indicates the height in the radial direction from the position PW to the edge 46 of the belt 14. A double-headed arrow HT indicates the height in the radial direction from the position PW to the outer edge of the belt 14. In the tire 2, the ratio (HB/HT) of the height HB relative to the height HT is preferably equal to or less than 0.75. The edge 46 of the belt 14 at which the ratio (HB/HT) is equal to or less than 0.75 reaches a buttress portion. Since the edge 46 of the belt 14 reaches the buttress portion, the size of the portion where the ground contact surface 52 and the belt 14 overlap each other during run-flat running is increased as shown in FIG. 4. In the tire 2, the run-flat durability is further improved. Furthermore, by making the ratio (HB/HT) equal to or less than 0.75, deformation of the shoulder portion during normal running is suppressed. In the tire 2, uneven wear at the shoulder portion is suppressed. The tire 2 has excellent wear resistance. From these standpoints, the ratio (HB/HT) is more preferably equal to or less than 0.70.

The ratio (HB/HT) is preferably equal to or greater than 0.60. By making the ratio (HB/HT) equal to or greater than 0.60, the edge 46 of the belt 14 is prevented from damaging the side portion 24 of the tire 2 even when the side portion 24 of the tire 2 bends during the normal running. In the tire 2, favorable durability during normal running is maintained. Furthermore, by making the ratio (HB/HT) equal to or greater than 0.60, the influence of the belt 14 on the vertical stiffness constant and the weight is further decreased. Since the side portion 24 can moderately bend, favorable rolling resistance is maintained. In the tire 2, favorable ride comfort, desired rolling resistance, and an appropriate weight are maintained. From these standpoints, the ratio (HB/HT) is more preferably equal to or greater than 0.65.

In FIG. 1, a double-headed arrow W indicates the width in the axial direction from the equator plane to the position PW. The ratio (WB/W) of the width WB relative to the width W is preferably equal to or greater than 0.85. By extending the edge 46 of the belt 14 to a position where the ratio (WB/W) is equal to or greater than 0.85, the size of the portion where the ground contact surface 52 and the belt 14 overlap each other during run-flat running can be increased more. In the tire 2, the run-flat durability is improved more. Thus, the wear resistance of the tire 2 can be improved more. The ratio (WB/W) is preferably equal to or less than 0.90. By making the ratio (WB/W) equal to or less than 0.90, the edge 46 of the belt 14 is more effectively prevented from damaging the side portion 24 during normal running. In the tire 2, favorable durability during normal running is maintained.

Figure 2:
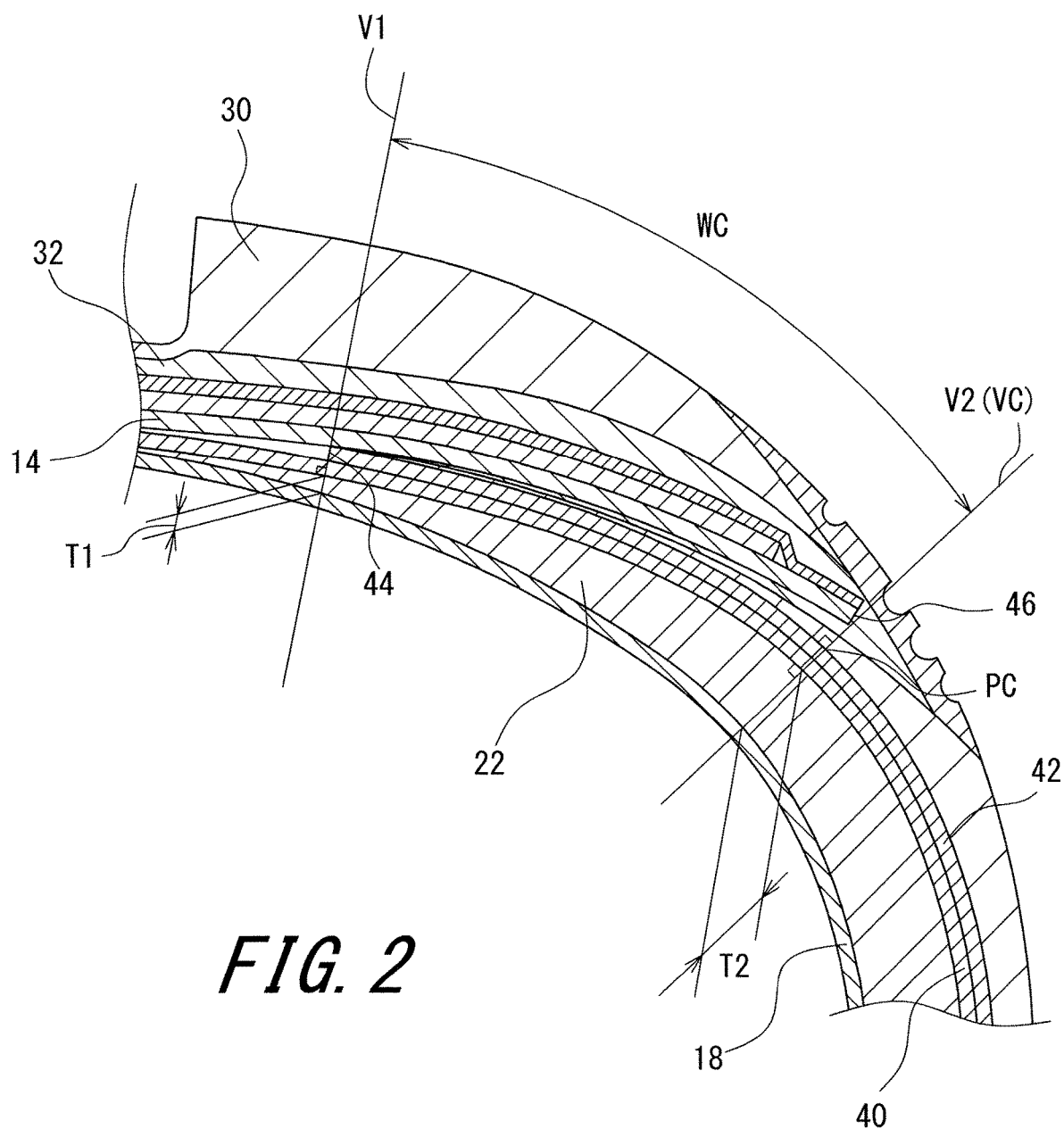
FIG. 2 is an enlarged cross-sectional view of a portion of the tire in FIG. 1.

In FIG. 2, a straight line V1 is a normal line drawn from an end of the turned-up portion 42 toward the outer surface of the load support layer 22. A double-headed arrow T1 indicates the distance between the outer surface and the inner surface of the load support layer 22 which distance is measured along the normal line V1. This distance is the thickness of the load support layer 22 which thickness is measured along the normal line V1. A straight line V2 is a normal line drawn from the edge 46 of the belt 14 toward the outer surface of the load support layer 22. A double-headed arrow T2 indicates the distance between the outer surface and the inner surface of the load support layer 22 which distance is measured along the normal line V2. This distance is the thickness of the load support layer 22 which thickness is measured along the normal line V2. The value of the thickness T2 is set in light of run-flat durability and ride comfort.

The ratio (T2/T1) of the thickness T2 relative to the thickness T1 is preferably equal to or less than 8.0. By determining the thickness T1 such that the ratio (T2/T1) is equal to or less than 8.0, the load support layer 22 effectively suppresses buckling. Thus, the ground contact area during run-flat running is further increased. In the tire 2, the run-flat durability is further improved. From this standpoint, the ratio (T2/T1) is more preferably equal to or less than 7.0. The ratio (T2/T1) is preferably equal to or greater than 1.0. By making the ratio (T2/T1) equal to or greater than 1.0, an increase in the rolling resistance can be effectively suppressed. From this standpoint, the ratio (T2/T1) is more preferably equal to or greater than 2.0.

In FIG. 2, a straight line VC is a normal line drawn from the edge 46 of the belt 14 toward the outer surface of the turned-up portion 42. In FIG. 2, the normal line VC overlaps the normal line V2. A point PC is the point of intersection between the normal line VC and the outer surface of the turned-up portion 42. A double-headed arrow WC indicates the distance from the edge 44 of the turned-up portion 42 to the point PC which distance is measured along the outer surface of the turned-up portion 42. The distance WC is preferably equal to or greater than 20 mm. In the tire 2, the edge 44 of the turned-up portion 42 is sufficiently away from the edge 46 of the belt 14. In the tire 2, occurrence of loose at the edge 46 of the belt 14 due to the edge 44 of the turned-up portion 42 being close to the edge 46 of the belt 14 is suppressed. From this standpoint, the distance WC is more preferably equal to or greater than 25 mm. The distance WC is preferably equal to or less than 40 mm. By making the distance WC equal to or less than 40 mm, the influence of the turned-up portion 42 on the weight of the tire 2 is suppressed. In the tire 2, an appropriate weight is maintained. From this standpoint, the distance WC is more preferably equal to or less than 35 mm.

In FIG. 1, a double-headed arrow WI indicates the maximum thickness of the load support layer 22, and specifically indicates the maximum value of the distance between the inner surface and the outer surface of the load support layer 22 which distance is measured along a line normal to the inner surface of the load support layer 22. Making the ratio (SP/WB) equal to or greater than 0.1 and equal to or less than 0.6 and making the ratio (HB/HT) equal to or greater than 0.60 and equal to or less than 0.75 as described above, effectively contribute to improvement of the run-flat durability. In the tire 2, even when the maximum width WI is made smaller than that in a conventional tire, favorable run-flat durability can be maintained. By decreasing the maximum width WI, the vertical stiffness constant can be reduced. The tire 2 has improved ride comfort. By decreasing the maximum width WI, the weight of the tire 2 can be reduced. In the tire 2, improvement of the ride comfort and reduction of the weight of the tire 2 can be achieved while favorable run-flat durability is maintained.

In the tire 2, the dimensions and angles of each component of the tire 2 are measured in a state where the tire 2 is mounted on a normal rim and inflated to a normal internal pressure, unless otherwise specified. During the measurement, no load is applied to the tire 2. In the present specification, the normal rim means a rim specified in a standard on which the tire 2 is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire 2 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. In the case where the tire 2 is designed for a passenger car, the dimensions and angles are measured in a state where the internal pressure is 180 kPa. In the present specification, a normal load means a load specified in the standard on which the tire 2 is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRO standard are normal loads.

EXAMPLES

Example 1

A pneumatic tire (run flat tire) of Example 1 having the configuration shown in FIG. 1 and having specifications shown in Table 1 below was obtained. The size of the tire is 225/60RF18. In the tire, the maximum width WI of each load support layer is 9.0 mm. The thickness T2 is 7.5 mm.

Comparative Example 1

A tire of Comparative Example 1 was obtained in the same manner as in Example 1, except the ratio (SP/WB), the ratio (HB/HT), and the ratio (WB/W) were as shown in Table 1. The tire of Comparative Example 1 is a conventional run flat tire including conventional load support layers and a conventional belt.

Examples 2 and 3 and Comparative Examples 2 and 3

Tires of Examples 2 and 3 and Comparative Examples 2 and 3 were obtained in the same manner as in Example 1, except the ratio (SP/WB) was as shown in Table 1.

Examples 4 to 7

In tires of Examples 4 to 7, the position of the edge of the belt was changed such that the ratio (HB/HT) was as shown in Table 2. Since the position of the edge of the belt is changed, the ratio (WB/W), the ratio (T2/T1), and the distance WC are also changed as shown in Table 2. The others are the same as in Example 1.

Examples 8 to 10

Tires of Examples 8 to 10 were obtained in the same manner as in Example 1, except the thickness T1 was changed such that the ratio (T2/T1) was as shown in Table 3.

Examples 11 to 13

Tires of Examples 11 to 13 were obtained in the same manner as in Example 1, except the position of the edge of each turned-up portion was changed such that the distance WC was as shown in Table 4. Since the position of the edge of each turned-up portion is changed, the ratio (T2/T1) is changed as shown in Table 4.

Example 14

A tire of Example 14 was obtained in the same manner as in Example 1, except the maximum width WI was as shown in Table 4.

[Run-Flat Durability]
Each tire was mounted onto a normal rim (size=6.5 J) and attached to a running tester. A punctured state was reproduced by setting the internal pressure of the tire to normal pressure. After the attachment, a vertical load corresponding to 65% of the maximum applied load specified in JATAM was applied to the tire. The tire was caused to run on the running tester at a speed of 80 km/h, and the running distance until the tire became damaged was measured. The results are shown in Tables 1 to 4 below as index values with the running distance of Comparative Example 1 being defined as 100. The higher the value is, the better the result is. The higher the value is, the more excellent the tire is in run-flat durability.

[Tire Weight]
The weight of each tire was measured. The results are shown in Tables 1 to 4 below as index values with the value of Comparative Example 1 being defined as 100. A lower value indicates a lower weight. The lower the value is, the better the result is.

[Vertical Stiffness Constant]
The vertical stiffness constant of the tire was measured under the following conditions.
Used rim: 6.5 J
Internal pressure: 220 kPa
Load: 5.0 kN
The results are shown in Tables 1 to 4 below as index values with the value of Comparative Example 1 being defined as 100. A lower value represents a lower vertical stiffness constant. The lower the value is, the better the result is.

[Rolling Resistance]
The rolling resistance was measured with a rolling resistance tester under the following measurement conditions.
Used rim: 6.5 J
Internal pressure: 220 kPa
Load: 5.0 kN
Speed: 80 km/h
The results are shown in Tables 1 to 4 below as index values with the value of Comparative Example 1 being defined as 100. The lower the value is, the better the result is.

[Wear Resistance Evaluation]
Each tire was mounted onto a standard rim (size=6.5 J) and attached to a commercially available passenger car. The internal pressure of the tire was set to 220 kPa. After the attachment, a vertical load corresponding to the maximum applied load specified in JATAM was applied to the tire. The vehicle was caused to run on a test course until the running distance thereof reached 150 km. A wear amount of a shoulder portion of the tire was measured. The reciprocal of this value is shown in Tables 1 to 4 below as an index value with the value of Comparative Example 1 being defined as 100. A higher value indicates that the life of the tire against wear is longer. The higher the value is, the better the result is.

[General Durability]

Each tire was mounted onto a normal rim (6.5 J) and inflated with air to an internal pressure of 220 kPa. The tire was attached to a running tester, and a vertical load of 5.0 kN was applied to the tire. The tire was caused to run on the running tester at a speed of 80 km/h. The tire was evaluated as OK if the tire ran for 60000 km without any damage, and was evaluated as NG if the tire became damaged before running for 60000 km. The results are shown in Tables 1 to 4 below.

TABLE 1

Results of Evaluation

|  | Comparative Example 1 | Example 1 | Comparative Example 2 | Example 2 | Example 3 | Comparative Example 3 |
|---|---|---|---|---|---|---|
| Ratio (SP/WB) | 0.80 | 0.20 | 0.08 | 0.50 | 0.60 | 0.70 |
| Ratio (HB/HT) | 0.80 | 0.68 | 0.68 | 0.68 | 0.68 | 0.68 |
| Ratio (WB/W) | 0.78 | 0.88 | 0.88 | 0.88 | 0.88 | 0.88 |
| Ratio (T2/T1) | — | 4.0 | 4.0 | 4.0 | 4.0 | 4.0 |
| Distance WC [mm] | 25 | 25 | 25 | 25 | 25 | 25 |
| Maximum width WI | 100 | 100 | 100 | 100 | 100 | 100 |
| Weight | 100 | 103 | 104 | 102 | 102 | 102 |
| Vertical stiffness constant | 100 | 103 | 104 | 101 | 101 | 100 |
| Rolling resistance | 100 | 101 | 110 | 101 | 101 | 101 |
| Run-flat durability | 100 | 140 | 139 | 132 | 128 | 110 |
| Wear resistance | 100 | 120 | 120 | 120 | 119 | 118 |
| General durability | OK | OK | OK | OK | OK | OK |

TABLE 2

Results of Evaluation

|  | Example 4 | Example 5 | Example 6 | Example 7 |
|---|---|---|---|---|
| Ratio (SP/WB) | 0.20 | 0.20 | 0.20 | 0.20 |
| Ratio (HB/HT) | 0.80 | 0.75 | 0.60 | 0.55 |
| Ratio (WB/W) | 0.74 | 0.80 | 0.89 | 0.92 |
| Ratio (T2/T1) | 2.2 | 2.7 | 4.3 | 4.5 |
| Distance WC [mm] | 14 | 20 | 36 | 40 |
| Maximum width WI | 100 | 100 | 100 | 100 |
| Weight | 101 | 102 | 104 | 105 |
| Vertical stiffness constant | 100 | 101 | 104 | 108 |
| Rolling resistance | 100 | 101 | 102 | 106 |
| Run-flat durability | 120 | 130 | 142 | 142 |
| Wear resistance | 105 | 120 | 122 | 122 |
| General durability | OK | OK | OK | NG |

TABLE 3

Results of Evaluation

|  | Example 8 | Example 9 | Example 10 |
|---|---|---|---|
| Ratio (SP/WB) | 0.20 | 0.20 | 0.20 |
| Ratio (HB/HT) | 0.68 | 0.68 | 0.68 |
| Ratio (WB/W) | 0.88 | 0.88 | 0.88 |
| Ratio (T2/T1) | 9.0 | 8.0 | 1.0 |
| Distance WC [mm] | 25 | 25 | 25 |
| Maximum width WI | 100 | 100 | 100 |
| Weight | 102 | 102 | 103 |
| Vertical stiffness constant | 103 | 103 | 103 |
| Rolling resistance | 100 | 101 | 105 |
| Run-flat durability | 121 | 127 | 142 |
| Wear resistance | 120 | 120 | 120 |
| General durability | OK | OK | OK |

TABLE 4

Results of Evaluation

|  | Example 11 | Example 12 | Example 13 | Example 14 |
|---|---|---|---|---|
| Ratio (SP/WB) | 0.20 | 0.20 | 0.20 | 0.20 |
| Ratio (HB/HT) | 0.68 | 0.68 | 0.68 | 0.68 |
| Ratio (WB/W) | 0.88 | 0.88 | 0.88 | 0.88 |
| Ratio (T2/T1) | 1.6 | 2.8 | 7.8 | 4.0 |
| Distance WC [mm] | 10 | 20 | 40 | 25 |
| Maximum width WI | 100 | 100 | 100 | 80 |
| Weight | 102 | 102 | 104 | 85 |
| Vertical stiffness constant | 102 | 103 | 103 | 80 |
| Rolling resistance | 101 | 101 | 101 | 85 |
| Run-flat durability | 135 | 138 | 140 | 112 |
| Wear resistance | 120 | 120 | 120 | 120 |
| General durability | NG | OK | OK | OK |

As shown in Tables 1 to 4, the evaluation is higher in the tires of the examples than in the tires of the comparative examples. From the results of evaluation, advantages of the present invention are clear.

The tire described above is applicable to various vehicles.

The above descriptions are merely illustrative examples, and various modifications can be made without departing from the principles of the present invention.

What is claimed is:

1. A pneumatic tire comprising a tread, a pair of beads, a carcass, a belt, and a pair of load support layers, wherein the carcass extends on and between the one bead and the other bead, the belt is laminated on the carcass at a radially inner side of the tread, the belt comprising two belt layers each including a large number of cords aligned with each other and tilted relative to an equator plane at an angle of greater than or equal to 10° and less than or equal to 35°, the tilt direction of one of the belt layers being opposite to the tilt direction of the other belt layer relative to the equator plane, a pair of side portions each extend from a respective edge of the tread, each side portion including a respective one of the pair of beads and a portion of a respective one of the pair of load support layers, each load support layer extends from a respective side portion of the tire to a radially inner side of the belt at an inner side of the carcass, the load support layer at the radially inner side of the belt being tapered inward in the axial direction to an outer edge of the load support layer, a ratio SP/WB of a width SP from the equator plane to the respective outer edge of the load support layer, relative to a width WB from the equator plane to a respective outermost edge of the belt, in an axial direction is equal to or greater than 0.1 and equal to or less than 0.6, wherein on each side of the equator plane when a position on an outer surface of the tire at which position the tire has a maximum width is denoted by PW, a height in a radial direction from the position PW to the axially outermost edge of the belt is denoted by HB, and a height in the radial direction from the position PW to a radially outer edge of the belt is denoted by HT, a ratio HB/HT of the height HB relative to the height HT is equal to or greater than 0.60 and equal to or less than 0.75, and wherein on each side of the equator plane a ratio WB/W of the width WB from the equator plane relative to a width W from the equator plane to the position PW is equal to or greater than 0.85 and equal to or less than 0.90.

2. The pneumatic tire according to claim 1, wherein the carcass includes a carcass ply, each bead includes a bead core, the carcass ply is turned up around each bead from an inner side toward an outer side in the axial direction, and because of this turning-up, a main portion and turned-up portions are formed in the carcass ply, an axially innermost edge of each turned-up portion reaches a position between the respective axially outermost edge of the belt and the respective outer edge of the load support layer, and on each side of the equator plane when a thickness of the load support layer which thickness is measured along a normal line V1 drawn from the edge of the turned-up portion toward an outer surface of the load support layer is denoted by T1, and a thickness of the load support layer which thickness is measured along a normal line V2 drawn from the axially outermost edge of the belt toward the outer surface of the load support layer is denoted by T2, a ratio T2/T1 of the thickness T2 relative to the thickness T1 is equal to or greater than 1.0 and equal to or less than 8.0.

3. The pneumatic tire according to claim 2, wherein on each side of the equator plane when a point of intersection between an outer surface of the turned-up portion and a normal line VC drawn from the axially outermost edge of the belt toward the outer surface of the turned-up portion is denoted by PC, a distance WC from the edge of the turned-up portion to the point PC which distance is measured along the outer surface of the turned-up portion is equal to or greater than 20 mm and equal to or less than 40 mm.

* * * * *